April 21, 1970  R. H. MERRYMAN  3,507,588
BURNING OF RESIDUAL LIQUOR FUELS
Filed Oct. 3, 1968

INVENTOR.
Ralph H. Merryman
BY
*J. Maguire*
ATTORNEY

United States Patent Office 3,507,588
Patented Apr. 21, 1970

3,507,588
BURNING OF RESIDUAL LIQUOR FUELS
Ralph H. Merryman, 985 Ridgefield Ave.,
Alliance, Ohio 44601
Filed Oct. 3, 1968, Ser. No. 764,809
Int. Cl. F23d *11/10*
U.S. Cl. 431—3                                    4 Claims

ABSTRACT OF THE DISCLOSURE

A method of burning residual liquor fuels that tend to polymerize at elevated temperatures whereby the fuel and an atomizer fluid at a temperature higher than the polymerization temperature of the fuel are both supplied to an atomizer over respective flow paths that are adjacently coextensive, and the transfer of heat from the atomizer fluid to the fuel is limited by means of a layer of insulating surrounding a conduit defining the fuel supply path to maintain the fuel below its polymerization temperature and thereby prevent polymerization of the fuel which would tend to clog the atomizer.

BACKGROUND AND SUMMARY OF THE INVENTION

The present invention relates in general to the burning of residual liquor fuels, and more particularly to a method of burning residual liquor fuels such as ammonia and magnesium base pulping liquors.

Renewed interest in the ammonia base pulping process has recently increased because of economic changes such as the declining cost of ammonia, and because the ammonia base process offers a pulp of good quality and also certain desirable system features. One desirable feature is that the waste liquor can be burned in suspension within a conventional furnace to obtain a relatively high recovery of heat.

The waste liquor from the magnesium base process can also be burned in suspension to give an attractive heat recovery.

However, these waste liquors when subjected to elevated temperatures have a tendency to polymerize or otherwise form solids precipitates that clog the atomizers used for spraying the liquor fuel into the furnace for combustion with preheated air supplied thereto. For efficient atomization a hot fluid, such as steam or air, is supplied to the atomizer to disperse the fuel into a fine spray of atomized droplets. The temperature of the atomizer fluid is normally in the range of 300° to 550° F. This is well above the polymerization temperature of the fuel, which for ammonia and magnesium base liquors occurs at temperatures of 230° F. and upwards.

Where the fuel and atomizer fluid flow paths to the atomizer are adjacently coextensive, as in the case of typical liquid fuel burners such as those described and shown in U.S. Patent No. 3,363,840 to G. S. Hall, U.S. Patent No. 3,341,131 to H. G. Stallkamp, and U.S. Patent No. 2,812,212 to C. E. Rogers et al., there is the danger that the higher temperature atomizer fluid will cause the temperature of the fuel flowing in the conduit to the atomizer to increase to a value above the fuel polymerization temperature, in which event the atomizer will become clogged rapidly, and have to be cleaned at frequent intervals.

The invention provides a method of burning such residual liquors whereby the clogging problem is relieved. This is done by limiting the transfer of heat to the liquor fuel flowing along the supply path to the atomizer to maintain the fuel along the path at a temperature safely below a predetermined polymerization temperature, which for ammonia base and magnesium base pulping liquors is preferably 230° F. maximum. Limitation of such heat transfer is expediently accomplished by means of a layer of insulation surrounding the conduit defining the fuel supply path to the atomizer.

In the practice of the invention, it has been found that where the temperature of the liquor fuel entering the atomizer is held below 230° F., clogging of the atomizer is effectively prevented. In this connection, it is to be understood that the atomizer clogging heretofore encountered is believed to be the result of fuel polymerization. However, whatever physical or chemical phenomena are actually responsible for formation of the deposits which clog the fuel atomizer, it has been found that the effects of such phenomena are substantially eliminated through the use of the invention.

Accordingly, as used herein the term "polymerization" is intended to designate broadly the formation in the fluent fuel of solid products which collect in the atomizer to clog it, and such term should not be restricted in its interpretation to the joining of individual molecules. It is recognized that there may be some possibility, even when using the method of the invention, that formation of some liquid polymers might occur, and that such polymers may not adversely affect the normal atomizing of the liquor fuel, in which case the invention is not concerned with the formation of such harmless products.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DESCRIPTION OF THE PREFERRED EMBODIMENTS OF THE INVENTION

Figure 1:
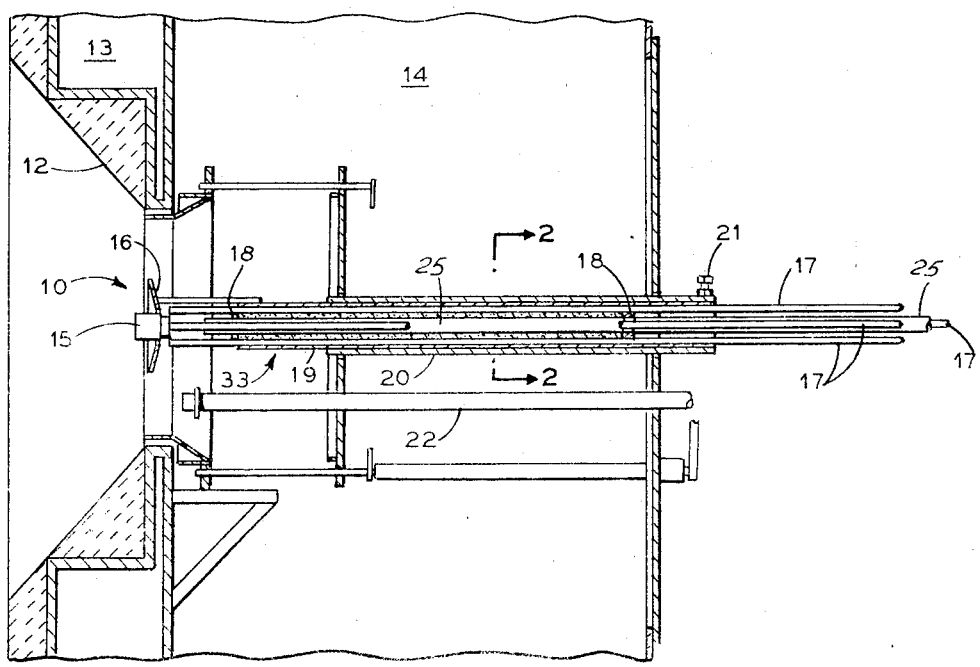
FIG. 1 is a longitudinal view, partly in section, of a liquid fuel burner as installed in a furnace to be fired, which burner is modified to burn a residual liquor fuel in accordance with the method of the invention.
Figures 2, 3:
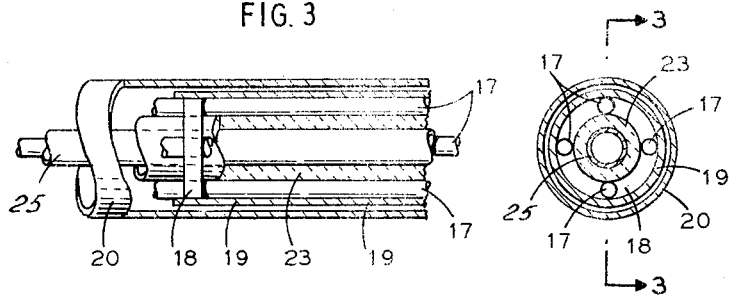
FIG. 2 is a transverse cross-sectional view of the burner shown in FIG. 1 as taken along line 2—2.
FIG. 3 is a longitudinal view, partly in section, of a detail portion of the burner shown in FIG. 1 and indicated therein by the arrow 33.

Referring to FIGS. 1–3, the liquid fuel burner 10 is arranged to fire through a port 12 in a furnace wall 13 and extends longitudinally through a windbox 14 mounted exterior of the furnace wall.

Burner 10 includes a fuel atomizing assembly having a sprayer head 15 at its distal end, which end is equipped with an impeller 16 positioned in the throat of burner port 12.

A residual liquor fuel, such as ammonia or magnesium base pulping liquor is supplied to sprayer head 15 through a central tubular conduit 25 connected at one end to sprayer head 15 and connected at the opposite end to a source of such fuel (not shown).

An atomizer fluid, expediently steam, is also supplied to sprayer head 15 through four parallel tubular conduits 17, each connected at one end to sprayer head 15 and connected at the opposite end to a source of steam (not shown). The steam conduits 17 are radially spaced from the fuel conduit 25 at substantially equal distances and are angularly spaced apart from one another 90 degrees, the radial and angular positions of conduits 17 being maintained by a pair of drilled spacer discs 18.

Surrounding the conduits 25 and 17 is a cover tube 19 that is received through a guide tube 20 supported by the wall structure of windbox 14. The cover tube 19 is axially slidable in guide tube 20 for adjusting the position of sprayer head 15, and can be locked in place by means of a setscrew 21.

In the atomizing zone of sprayer head 15, the steam delivered through conduits 17 and the fuel delivered through conduit 25 are mixed to form a spray of atomized fuel which is directed into the furnace volume adjoining port 12, and is ignited with the aid of a gas pilot 22.

It can be noted that in the burner 10 the flow paths of the steam and fuel are adjacently coextensive over the length of cover tube 19 up to the connections of conduits 25 and 17 to sprayer head 15. The burner assembly also passes through the windbox 14. The steam temperature is ordinarily 300° F., or more for efficient atomization and the air temperature is of the order of 550° F. Thus the burner is subjected to a comparatively high temperature environment.

With ammonia and magnesium base pulping liquor, it has been found that clogging of sprayer head 15 occurs and that solids are deposited on the inside surface of the fuel conduit 25 if the temperature of such liquor fuel rises much above 230° F.

According to the invention, the temperature of the fuel flowing along the supply path defined by conduit 25 is maintained below this predetermined 230° F. limit, by limiting the transfer of heat to such flowing fuel from the high temperature environment through the provision of insulation means 23 completely encasing conduit 25 throughout substantially the entire length which is exposed to the high temperature heat source. The insulation layer 23 is expediently made of Kaowool, although any other suitable insulation material can be substituted. The thickness of insulation layer 23 necessary to maintain the fuel temperature below 230° F. can be determined through the application of routine engineering calculations taking into account of the heat transfer characteristics of the insulating material, the steam temperature in conduits 17 and the temperature of the air in the surrounding windbox 14.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A method of burning residual liquor fuels that polymerize at elevated temperatures, which comprises supplying a residual liquor fuel to an atomizing zone by continuous flow along a predetermined path from a source of such fuel, supplying an atomizer fluid to said atomizing zone at a temperature higher than the polymerization temperature of said fuel by continuous flow along a predetermined path from a source of such atomizer fluid, mixing in said atomizing zone said fuel and atomizer fluid to form a spray of atomized fuel, igniting said fuel spray to burn same, and limiting the transfer of heat to the fuel flowing along the fuel supply path to maintain the temperature of the fuel along said path below a predetermined temperature to minimize polymerization of the fuel before its entry into said atomizing zone.

2. A method according to claim 1 where said fuel is an ammonia base pulping liquor.

3. A method according to claim 1 wherein said fuel is a magnesium base pulping liquor.

4. A method according to claim 1 wherein said atomizer fluid is supplied to the atomizing zone at a temperature above 300° F. and along a flow path adjacently coextensive with a portion of the fuel supply path, and the fuel flowing along said fuel supply path is maintained at a temperature below 230° F. by means of a layer of insulation surrounding a conduit defining said fuel supply path.

References Cited

UNITED STATES PATENTS

| | | | |
|---|---|---|---|
| 1,169,433 | 1/1916 | Shelley | 239—423 XR |
| 2,457,304 | 12/1948 | Crowe | 239—422 XR |
| 2,907,529 | 10/1959 | Ghelfi | 239—423 XR |
| 3,050,374 | 8/1962 | Burt et al. | 23—277 |
| 3,284,168 | 11/1966 | Braconier et al. | 23—277 |

DONLEY J. STOCKING, Primary Examiner

R. A. DUA, Assistant Examiner

U.S. Cl. X.R.

23—262, 277; 239—423